United States Patent
Carlstrom, Jr. et al.

(10) Patent No.: US 7,875,400 B2
(45) Date of Patent: Jan. 25, 2011

(54) METHOD AND APPARATUS FOR INTERNAL HYDRATION OF A FUEL CELL SYSTEM

(75) Inventors: Charles M. Carlstrom, Jr., Saratoga Springs, NY (US); Russ Marvin, Goshen, CT (US); David DeAngelis, Albany, NY (US); David H. Leach, Albany, NY (US); Louis Schick, Delmar, NY (US)

(73) Assignee: MTI Microfuel Cells, Inc., Albany, NY (US)

( * ) Notice: Subject to any disclaimer, the term of this patent is extended or adjusted under 35 U.S.C. 154(b) by 991 days.

(21) Appl. No.: 11/684,463

(22) Filed: Mar. 9, 2007

(65) Prior Publication Data

US 2008/0220305 A1    Sep. 11, 2008

(51) Int. Cl.
*H01M 8/04* (2006.01)
*H01M 8/06* (2006.01)

(52) U.S. Cl. .................. 429/434; 429/414; 429/440

(58) Field of Classification Search .......... 429/26, 429/414, 434, 440
See application file for complete search history.

(56) References Cited

U.S. PATENT DOCUMENTS

| | | | |
|---|---|---|---|
| 5,432,020 A | | 7/1995 | Fleck |
| 5,759,712 A | | 6/1998 | Hockaday |
| 6,106,964 A | | 8/2000 | Voss et al. |
| 6,458,479 B1 | * | 10/2002 | Ren et al. ............ 429/33 |
| 6,696,192 B2 | * | 2/2004 | Kanai et al. ............ 429/34 |
| 6,759,154 B2 | | 7/2004 | O'Brien |
| 6,864,005 B2 | | 3/2005 | Mossman |
| 6,989,206 B2 | | 1/2006 | Drake |
| 2004/0209133 A1 | | 10/2004 | Hirsch |
| 2004/0209136 A1 | | 10/2004 | Ren et al. |
| 2004/0209154 A1 | | 10/2004 | Ren et al. |
| 2005/0287416 A1 | | 12/2005 | Ikezoe |
| 2007/0184336 A1 | | 8/2007 | Kim et al. |
| 2010/0124677 A1 | | 5/2010 | Leach |
| 2010/0124683 A1 | | 5/2010 | Carlstrom, Jr. |

FOREIGN PATENT DOCUMENTS

EP    1612875 A1    4/2006
KR    100659132 B1    12/2006

OTHER PUBLICATIONS

PCT Search Report for Application No. PCT/US2008/002913, mail date Aug. 19, 2008, 6 pages.

* cited by examiner

*Primary Examiner*—Patrick Ryan
*Assistant Examiner*—Thomas H. Parsons
(74) *Attorney, Agent, or Firm*—Cesari and McKenna, LLP

(57) ABSTRACT

A fuel cell system having internal pushback of water, with a compact, thermally integrated enthalpy exchanger enabling effective hydration control in a small fuel cell system is provided. The enthalpy exchanger provides for the moisture in the fuel cell effluent to be used to humidify the incoming air stream to allow the fuel cell to be operated at higher temperatures while avoiding dry out. The enthalpy exchanger includes a moisture permeable membrane which collects moisture from the exhaust flow and makes this moisture available to an incoming air stream, thus humidifying the incoming air stream. In addition, the waste heat from the fuel cell reactions is transferred to the incoming air stream. The exhaust stream from the anode can also be used to provide additional moisture and heat to the enthalpy exchanger to be added to the incoming air stream. A water separator is also provided in one embodiment.

38 Claims, 5 Drawing Sheets

METHOD AND APPARATUS FOR INTERNAL HYDRATION OF A FUEL CELL SYSTEM

BACKGROUND OF THE INVENTION

1. Field of the Invention

This invention relates generally to fuel cell systems, and particularly, to the maintenance of adequate hydration in the fuel cell system.

2. Background Information

Fuel cells are devices in which an electrochemical reaction is used to generate electricity. A variety of materials may be suitable for use as a fuel depending upon the materials that are chosen for the components of the cell and the intended application for which the fuel cell will provide electric power.

Fuel cell systems may be divided into "reformer based" systems (which make up the majority of currently available fuel cells), in which fuel is processed to improve fuel cell system performance before it is introduced into the fuel cell, and "direct oxidation" systems in which the fuel is fed directly into the fuel cell without internal processing.

Because of their ability to provide sustained electrical energy, fuel cells have increasingly been considered as a power source for smaller devices including consumer electronics such as portable computers and mobile phones. Accordingly, designs for both reformer based and direct oxidation fuel cells have been investigated for use in portable electronic devices. Reformer based systems are not generally considered a viable power source for small devices due to size and technical complexity of present fuel reformers. Thus, significant research has focused on designing direct oxidation fuel cell systems for small applications, and in particular, direct systems using carbonaceous fuels including but not limited to methanol, ethanol, and aqueous solutions thereof. One example of a direct oxidation fuel cell system is a direct methanol fuel cell system. A direct methanol fuel cell power system is advantageous for providing power for smaller applications since methanol has a high energy content, thus providing a compact means of storing energy; it can be stored and handled with relative ease; and the reactions necessary to generate electricity can occur under ambient conditions.

DMFC power systems are also particularly advantageous since they are environmentally friendly. The chemical reaction in a DMFC power system yields only carbon dioxide and water as by products (in addition to the electricity produced). Moreover, a constant supply of methanol and oxygen (preferably from ambient air) can continuously generate electrical energy to maintain a continuous, specific power output. Thus, mobile phones, portable computers, and other portable electronic devices can be powered for extended periods of time while substantially reducing or eliminating at least some of the environmental hazards and costs associated with recycling and disposal of alkaline, NiMH and Li-Ion batteries.

The electrochemical reaction in a DMFC power system is a conversion of methanol and oxygen, in the presence of water, to $CO_2$ and water. More specifically, in a DMFC, methanol is introduced to the anode face of a protonically conductive, electronically non-conductive material in the presence of a catalyst and water. This typically includes the use of one or more diffusion layers to manage the flow of reactants and products within the fuel cell. When the fuel contacts the catalyst, hydrogen atoms from the fuel are separated from the other components of the fuel molecule. Upon closing of a circuit connecting a flow field plate at the anode to a flow field plate at the cathode, through an external electrical load, the protons and electrons from the hydrogen atoms are separated, resulting in the protons passing through the material electrolyte and the electrons traveling through a load in the external circuit. The protons and electrons then combine at the cathode with local oxygen, producing water. At the anode, the carbon component of the fuel is converted by combination with oxygen, in the presence of water, into $CO_2$, generating additional protons and electrons. As used herein, "membrane" or "electrolyte" may be used to refer to the protonically conducting, electronically non-conducting material.

The specific electrochemical processes in a DMFC are:

Anode Reaction: $CH_3OH + H_2O = CO_2 + 6H^+ + 6e$

Cathode Reaction: $\frac{3}{2}O_2 + 6H^+ + 6e = 2H_2O$

Net Reaction: $CH_3OH + \frac{3}{2}O_2 = CO_2 + H_2O$

Most commonly in prior art systems, the methanol in a DMFC is preferably used in an aqueous solution to reduce the effect of "methanol crossover." Methanol crossover is a phenomenon whereby methanol molecules pass from the anode side of the fuel cell, through the electrolyte material, to the cathode side of the fuel cell, without generating electricity. Heat is also generated when the "crossed over" methanol is oxidized in the cathode chamber. Methanol crossover occurs because present membrane electrolytes are permeable (to some degree) to methanol and water. One method of reducing methanol crossover is to introduce the methanol in an aqueous solution, thus providing the fuel cell with little more methanol than is required for the immediate reaction consumption, minimizing crossover without depriving the fuel cell of the necessary fuel. Methanol is carried over in part by electro-osmotic drag, along with the water in solution, by the essential proton flux of cell operation. Another means to diminish this characteristic is to supply the cell with methanol in vapor form. Details of a technique for providing fuel in such vapor form are set forth in commonly owned U.S. patent application Ser. No. 10/413,986, filed on Apr. 15, 2003, for a VAPOR FEED FUEL CELL WITH CONTROLLABLE FUEL DELIVERY, which is incorporated by reference herein in its entirety.

Many fuel cell systems are run at approximately room temperature, however, in order to obtain an adequate power output and maintain efficiency, such fuel cells are heavily catalyzed, which requires significant amounts of precious metal such as platinum. The cost of platinum has sharply increased in recent years. In order to increase the power output and efficiency of the fuel cell system without increasing the catalyst load, the fuel cell can be run at hotter temperatures in order to produce faster reaction kinetics. For the electrochemical reactions to occur at a higher rate, it is preferable to run the cell at as high a temperature as practical. However, the water needed to keep the membrane hydrated and the water needed for the anodic reaction can vaporize and thus is lost from the reaction zone at such higher temperatures.

Thus, running a fuel cell at higher temperatures requires a novel water balance management scheme or a dilute fuel in order to maintain the essential balance for efficient operation of the fuel cell and to assure that the electrolyte material remains hydrated, to provide both a local aqueous environment for the cell reactions, and a protonically conductive electrolytic medium. On the other hand, excessive hydration must be avoided to prevent flooding of the cathode with liquid water, which could restrict oxygen access to the cathode reaction site.

U.S. Pat. No. 5,432,020 to Fleck, 1995 describes a method for recycling some of the effluent water from the cell reaction to humidify incoming oxygen-supplying air, thus preventing excessive cathode drying by water evaporation to the air. It is also known in the art to apply a water-permeable membrane between incoming and exiting cathode-side flow streams using an external heat exchanger component to recycle reaction-product heat and water from the cell for warming and humidification of incoming reactants (see for example U.S. Pat. Nos. 6,106,964 and 6,416,895 to Voss; and U.S. Pat. No. 6,864,005 to Mossman). However, these prior techniques for recycling effluent water have required undesirably large or complex support devices external to the fuel cell itself, increasing cost, size and depriving the system of useful power density due to parasitic losses. Other approaches to water recovery and recirculation in a fuel cell are limited to liquid water, for use in aqueous-solution fueled cells (see for example U.S. Pat. No. 6,989,206 to Drake which teaches a water-permeable membrane for liquid recovery, or U.S. Pat. No. 6,759,154 to O'Brien, which teaches an air-conditioning system to create and capture liquid condensate for return to incoming reactant flow). These prior means require either management of liquid water or use of add-on equipment external to the fuel cell structure; adding cost, size, and risk of operating failure.

To summarize, there are several different ways which have been suggested in order to balance the water in a fuel cell system. The first is to introduce water from an outside source into the incoming air on the cathode side. Another method is to collect liquid water from the cell reaction within the cathode chamber and to deliver it back into the incoming air inlet. In still other environments, a heat exchanger/condenser, which is a discrete device, has been added on to the cathode side to capture the vapor which is out-going and allow it to travel back over to the inlet side. Other discrete devices in higher power fuel cell systems provide for a separate cooling system that circulates water around the condenser. A part of such cooling water can also be used to return heat and moisture to incoming air, but this requires a separate loop of pipes and conduits to be attached to the fuel cell system. Alternatively, one can operate the fuel cell at a lower temperature and sacrifice power output of the fuel cell, especially in high ambient temperatures.

Such retrofitted components add cost, size and complexity and increases the risk of operating failure of the fuel cell system. This is particularly true in smaller handheld devices in which direct oxidation fuel cells such as direct methanol fuel cells are used.

It is thus an object of the present invention to provide a fuel cell system which includes water balance and allows for higher operating temperatures. It is a further object of the invention to provide a system that includes more humidified air supply to the fuel cell without requiring an additional add-on discrete device in addition to fuel cell system components.

SUMMARY OF THE INVENTION

These and other disadvantages of prior techniques are overcome by the present invention in which an enthalpy exchanger is thermally integrated into a fuel cell. As used herein, "enthalpy" includes heat and moisture in a flow stream, typically generated in one of the reactions in the fuel cell core. In one embodiment, the incoming oxidant reactant is an inlet air stream that is directed into an inlet manifold. The incoming air stream is directed in a substantially counter flowing manner with an outgoing exhaust which travels in an exhaust manifold leading from the cathode of the fuel cell. The inlet manifold and the outlet manifold are separated by an enthalpy exchange element which may be a water permeable membrane that resists the flow of gas there through, but collects moisture from the exhaust and allows the moisture to be picked up by the passing inlet stream, thus humidifying the stream before it enters the cathode. By introducing humid air, rather than dry air, cathode dry-out is substantially reduced. The effects are further enhanced by a water pushback technique in which water is directed across the cell electrolyte from cathode to anode for the anodic reaction of the fuel cell. In a preferred embodiment, the enthalpy exchanger is a two layer structure that is folded onto the fuel cell so that it aligns with the "footprint" of the fuel cell.

In another embodiment, the exhaust from the anode is used to further heat the inlet air stream. Thus, an exhaust vent is coupled with the anode chamber and directs the exhaust from the anode into the incoming air inlet. To add further heat, the unreacted fuel in that exhaust reacts with the oxygen in the inlet air stream. Alternatively, a catalyst can be placed within the anode exhaust conduit to provide for further fuel reaction to create additional heat to be transferred to the inlet air stream. The anode exhaust stream can be controlled such that it is not continuously directed into the inlet air stream as desired. In a further alternative, the anode exhaust vent may be directed to the outlet stream of the cathode, to increase the temperature thereof and so increase the available heat transfer to the inlet air stream.

The anode exhaust vent can also contain a moisture-permeable barrier membrane along a wall thereof that contains the incoming air flow so that two walls of the conduit carrying the incoming air flow are comprised of a moisture-permeable membrane to provide additional hydration of the incoming air stream.

Heat transfer is enhanced by adding additional conductive or convective features to the system or by dispersing the area over which the heat is directed into the incoming air stream. Examples of such conductive features include conductive elements such as posts or pins arrayed within the active face area of the fuel cell and enthalpy exchanger and connecting the structures of each by direct thermal conduction through the elements.

Heating of the incoming air stream may be achieved alternatively or in addition to that provided by the fuel cell reactions by use of heat from another source, such as from electrical resistance heaters, or heat in the application device being powered by the fuel cell, over which the incoming air is directed. Such heating may be powered by the output of the fuel cell itself, An embodiment that includes a water separator is also provided.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
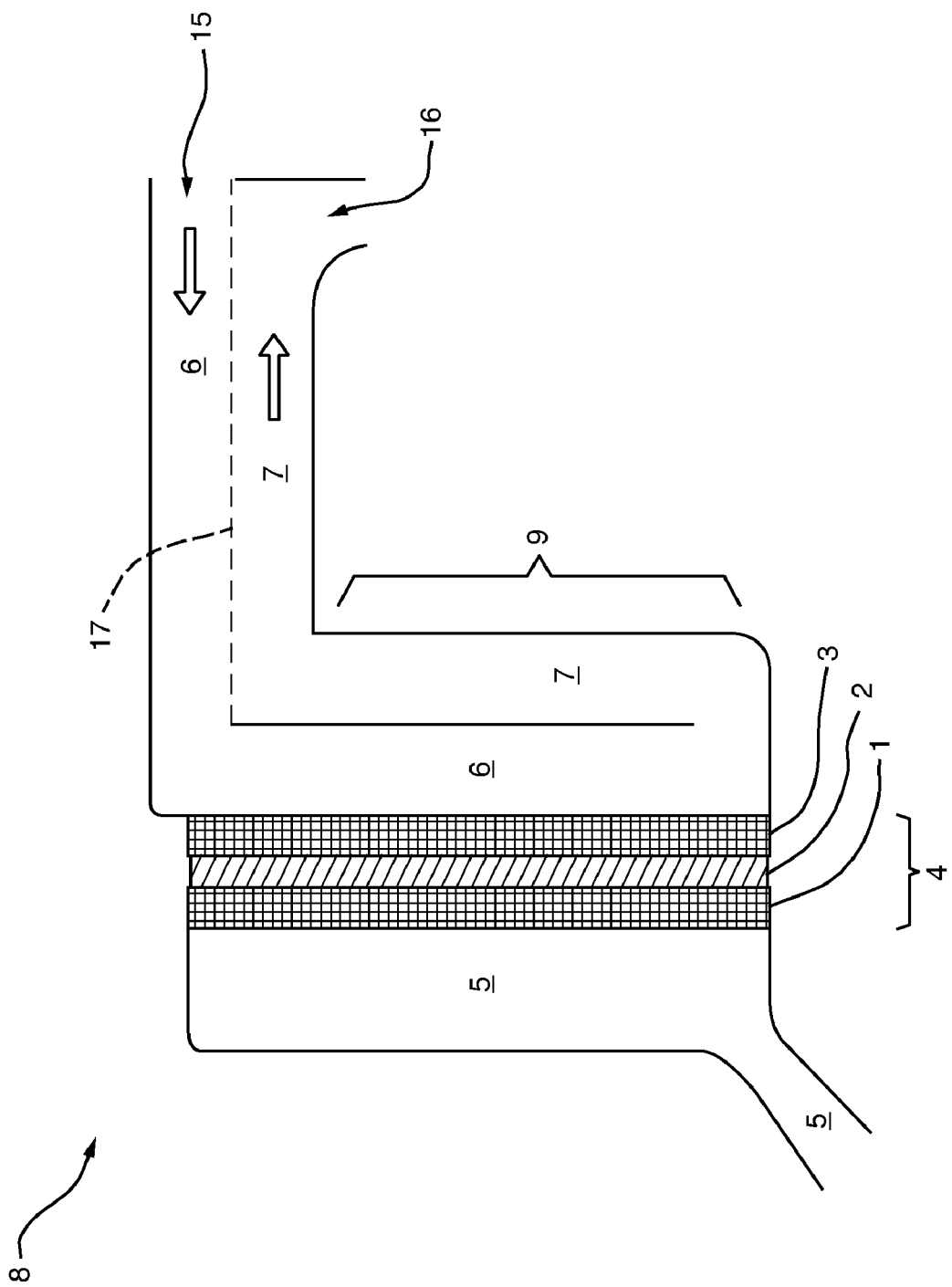
FIG. 1 is a schematic diagram of a fuel cell system incorporating one illustrative embodiment of the enthalpy exchanger of the present invention.

FIG. 1 illustrates a fuel cell system 8 which has an anode aspect 1 on one side of a protonically conductive layer 2 and a cathode aspect 3 on an opposing side of the protonically conductive layer 2. The protonically conductive material 2 is typically arranged as a layer, and is more typically a protonically conductive membrane comprised of a sulfonated polymer commercially available as Nafion® from the DuPont Corporation. The anode aspect 1 and the cathode aspect 3 may also be comprised of one or more diffusion layers which may be comprised of carbon paper or carbon cloth, or comprised of another material which may be sprayed or otherwise applied onto the protonically conductive layer such that it is in intimate contact with the protonically conductive material. As noted, the protonically conductive layer is typically coated or painted with an appropriate catalyst material, for example, platinum or ruthenium or alloys thereof, though other catalysts are within the scope of the invention. The anode 1, the protonically conductive layer 2, and the cathode 3 may together comprise a membrane electrode assembly (MEA) 4 as will be understood by those skilled in the art. However, as the component may or may not comprise a membrane and in fact may be a layer of a different molecular structure, the component 2 is referred to herein as the protonically conductive layer 2. Fuel is provided to the anode 1 through the fuel inlet 5. The fuel may be a constituent of vapor or liquid. The oxygen needed for the cathode reaction enters the fuel cell system through inlet 15 and passes through the conduit 16. The oxidizing reactant is provided to the cathode 3 preferably in a flow through manner. As the reactions proceed, the oxygen is provided to the cathode 3 and it combines with the protons that cross the layer, in the manner hereinbefore described, to form water.

In accordance with the invention, an enthalpy exchanger 9 is provided in the fuel cell system. More specifically, an incoming air stream enters the fuel cell system at inlet 15. The oxygen reacts on the cathode, but the remaining portions of the air form an exhaust stream that returns via conduit 7 and exits the fuel cell through outlet 16. For example, air is comprised of approximately 80% nitrogen and 20% oxygen plus other contaminants; and a small portion of the oxygen in the air is consumed as part of the fuel cell reactions thus, the fuel cell exhaust has a marginally lower oxygen content, and a higher percentage of non-reactive gasses than the inlet air. This exhaust is released through conduit 7. The conduit 7 is illustratively disposed in a counter flowing relationship with incoming air stream 6.

In accordance with the invention, an intermediate wall 17 of the enthalpy exchanger comprises of a water permeable membrane element. Element 17 is comprised substantially of Nafion® in the illustrative embodiment of the present invention, however, it should be understood that element 17 may be any material which is moisture permeable such that when moisture builds up on the material it acts as a barrier to air or other gasses. Thus, as the effluent passes through conduit 7 towards the outlet 16 of the fuel cell system, the enthalpy exchanger element 17 picks up water and makes this water available to the counter flowing, incoming air stream in the conduit 6 as it enters into the fuel cell system. Thus, the incoming air is thereby humidified by the moisture that has built up on the enthalpy exchange element 17.

Notably, water produced in the cathode reaction is partially pushed back through the protonically conductive layer 2 from the cathode side by a favorable gradient of partial pressure of water from the cathode 3 to the anode 1. Alternatively, the pushback can be achieved by a favorable hydro static pressure. The pushback can be further enhanced using a hydrophobic micro-porous layer or coating at the cathode side, and/or a hydrophilic microporous layer or coating at the anode side as taught in commonly owned United States Patent Application 2004-0209136 (now U.S. Pat. No. 7,407,721) and U.S. Patent Application 2004-0209154 (now U.S. Pat. No. 7,282,293), which are presently incorporated by reference herein.

In accordance with the invention, the net effluent water resulting from the cathode reaction that is not driven back to the anode side for the anode reaction is used in part to humidify the incoming air in conduit 6 by exchange of enthalpy with the outgoing exhaust 7 in the manner just described with respect to the element 17. The internal pushback of water in the cell 8 reduces the need to carry water evolved at the cathode 3 and re-humidify the incoming air in an external device in the manner conventionally known in the prior art, as described earlier. Thus, in the embodiment illustrated in FIG. 1, the enthalpy exchanger 9, which includes the moisture permeable membrane 17, is smaller, less costly, and more efficient as compared with the prior art described hereinbefore.

The reduced size of the enthalpy exchanger enables it to be as small in effective area (of enthalpy exchanger membrane 17) as the area of the fuel cell to be served. This size reduction enabled by coupling with internal pushback of water in the fuel cell makes possible the co-location of the enthalpy exchanger as an overlying layer on the fuel cell structure. Further, such overlying arrangement enables thermal integration whereby the enthalpy exchanger, by means of any of several thermal coupling and heat-directing methods and devices, can capture and utilize some of the waste heat of the fuel cell reactions to warm and humidify the incoming oxidant flow. Warmer, more humid inlet flow then allows higher temperature operation with reduced risk of dry-out in the fuel cell. With this hotter operation, greater power density and efficiency is obtained, now in a compact and integrated package.

Figure 2:
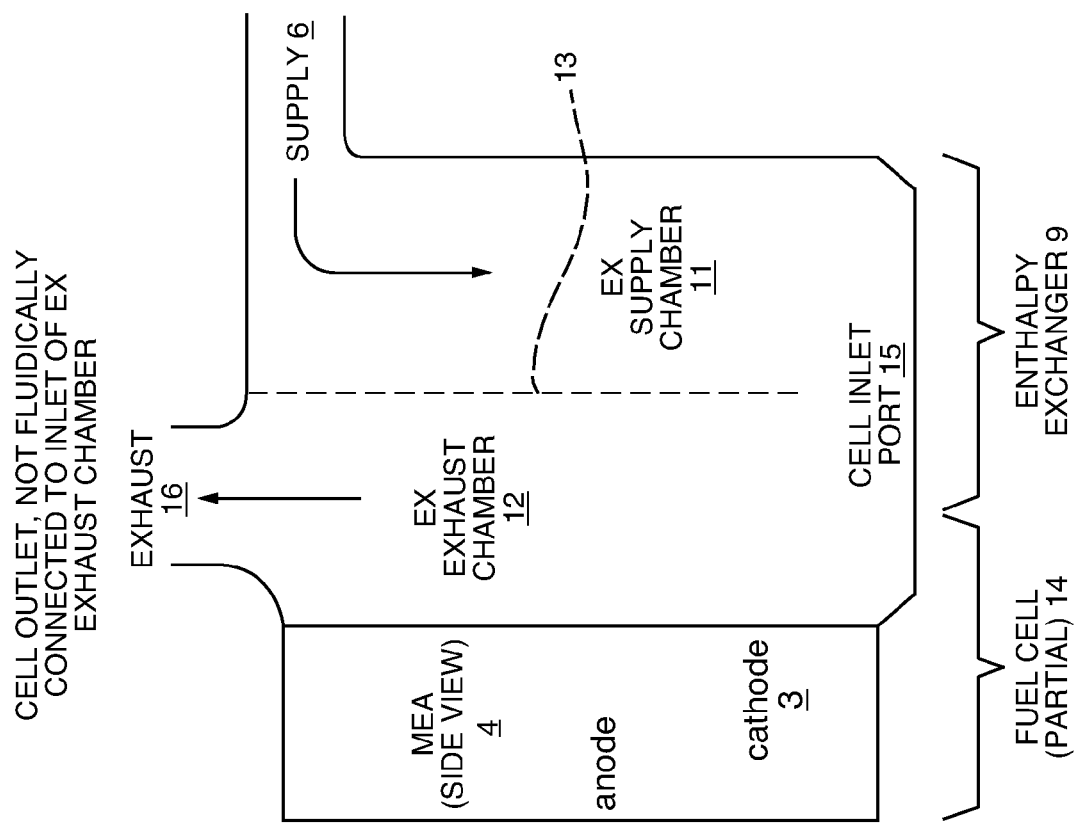
FIG. 2 is a schematic diagram of a fuel cell system having a thermally integrated enthalpy exchanger in accordance with another embodiment of the present invention.

FIG. 2 illustrates an embodiment of the present invention in which there is thermal and mechanical integration of the enthalpy exchanger element's exhaust channel 9 with the fuel cell's cathode chamber. This integration decreases the volume of the system allowing for thinner, lower volume fuel cell. In FIG. 2, the fuel cell system 200 includes a housing that encloses fuel cell 14 having MEA 4, (other portions of which are not shown), having a cathode 3 from which excess water is pushed back to the anode, and encloses the reduced-size enthalpy exchanger 9 of the present invention. The enthalpy exchanger, being smaller than if it handled the entire water load, shares the exhaust area of the fuel cell to create a thermally integrated enthalpy exchanger. The incoming air stream enters the fuel cell system through a small conduit 6 and passes into an enthalpy exchange supply chamber 11. The fuel cell exhaust exits the fuel cell system through an enthalpy exhaust chamber 12 and out of the system via the cell outlet 16. Notably, the exhaust outlet 16 is not fluidly connected to supply the inlet 15 of the enthalpy exhaust chamber. The incoming air manifold forming the supply chamber 11 is generally a first path over the cathode area separated from a generally counter-flowing exhaust manifold 12 by a moisture permeable membrane element 13, which is substantially comprised of Nafion® or other materials known to those skilled in the art. The resulting integral enthalpy exchanger has only two layers (chambers 11 and 12, over the fuel cell 14) reducing the total volume of the system and providing the waste heat of the cell reaction directly to the enthalpy exchanger, which is located between the inlet port 15 and exhaust port 16, without separate or external chambers for enthalpy exchange between incoming and exiting air.

Figure 3:
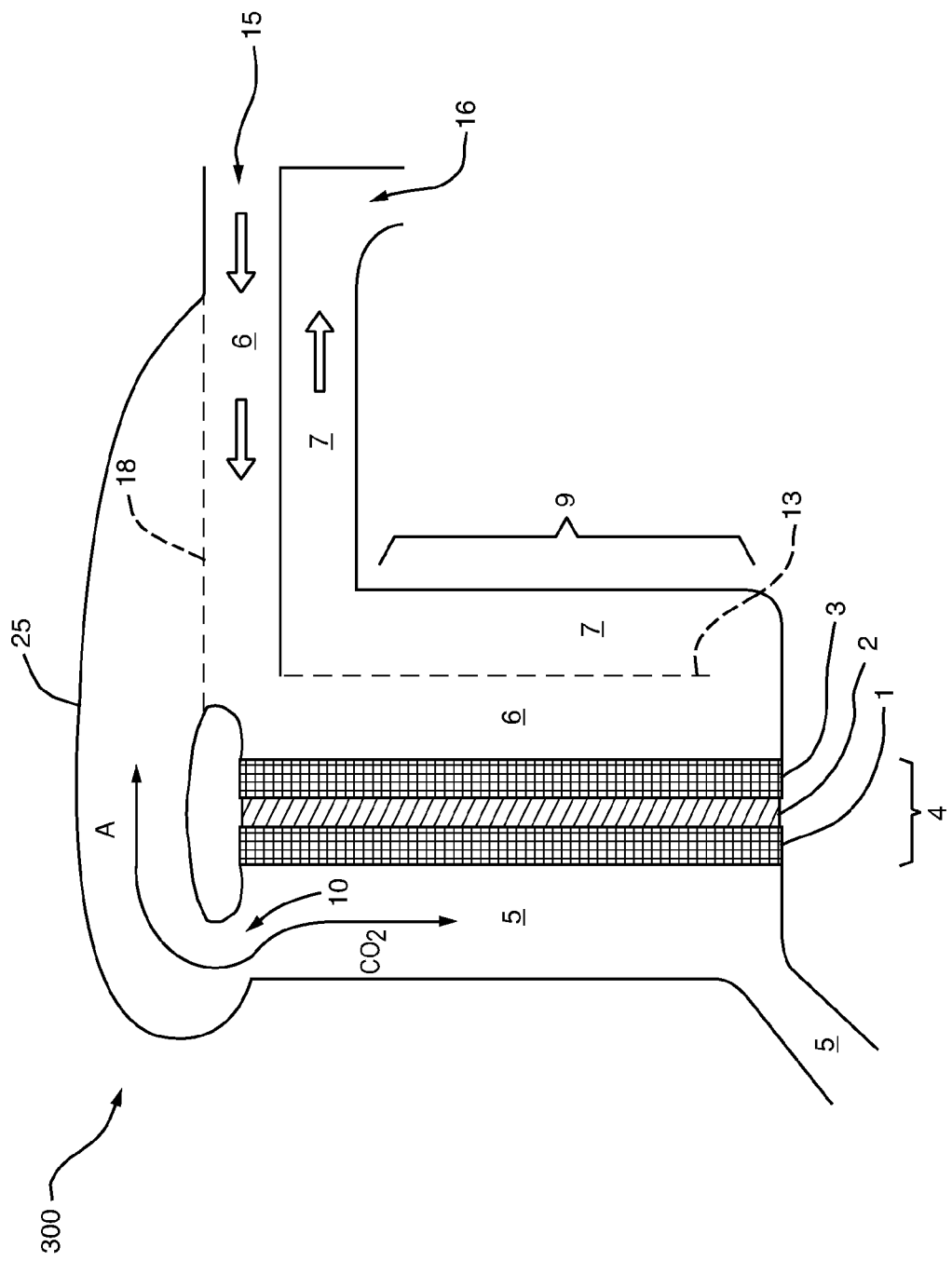
FIG. 3 is a schematic diagram of a fuel cell system which also incorporates a conduit coupling the anode exhaust stream with the incoming stream to provided additional heat and/or hydration.

FIG. 3 illustrates another embodiment of the invention in which the air inlet stream is heated to increase moisture recovery in the enthalpy exchanger 9, which further improves power density during operation of the cell at higher temperatures. In the configuration of FIG. 3, a second conduit 25 is added to the fuel cell system. Notably, the enthalpy exchanger 9 is configured such that the enthalpy exchange element 13 is internal to the fuel cell system. As illustrated in FIG. 3, the fuel enters the anode chamber through the conduit 5. As the anode reaction occurs, carbon dioxide and other exhaust gasses exit as shown by the arrow A though the conduit 25. Simultaneously, the incoming oxidant reactant which is, in the illustrative embodiment, an inlet air stream enters the inlet 15 through conduit 6 and travels past the cathode 3 to provide the oxygen needed for the cathode reaction. The effluent then continues travel to the conduit 7 and while doing so deposits moisture on the element 13 of the enthalpy exchanger 9 and collects there. The gaseous effluent exits the fuel cell system through the outlet 16. Moisture which has built up on the element 13 provides moisture for the incoming air flow through the conduit 6. Additionally, warm moist effluent containing $CO_2$ and other gasses from the anode half reaction travels through the conduit 25 and this moisture and heat (i.e., the enthalpy) is deposited on a second enthalpy exchange element 18. This further adds heat and moisture to the inlet air stream in conduit 6.

In addition, unconsumed fuel is present as a small fraction in the anode exhaust stream 10 which is exiting the fuel cell from the anode chamber 1. The anode exhaust stream 10 is directed through conduit 25 and re-injected into the inlet stream 6 which is incoming to the cathode. The small amount of fuel that is contained within that exhaust stream 10 can be used to further preheat the incoming oxidizing reactant stream in conduit 6 by its reaction with some of the air in the presence of a catalyst. Alternatively, in order to further enhance the reaction, the fuel can react on the element 18 where element 18 is a semi-permeable separating membrane 18 that is catalyzed. Thus, heat is generated and transferred from the flow 10 to the flow 6 so that the incoming oxidant reactant stream is heated. Those skilled in the art will recognize that sources of heat other than from the fuel cell reactions can also be used (in conjunction with or instead of the fuel cell reaction heat) to provide heat to the flow 6. The additional sources of heat include, but are not limited to, passing current through a resistive heater and/or using heat generated by the application device being powered by the fuel cell system. It is noted that such heating further aids in water vapor recovery by decreasing the relative humidity of the warmed incoming flow 6 even as it adds further water vapor.

To further improve performance, the injection process can be distributed over the length of the incoming stream 6 in the exchanger 9 to minimize the risk of over-drying the material near the inlet. Notably, heating of the incoming flow through conduit 6 can improve the overall efficiency and capacity of the fuel cell by decreasing the difference in the dew points of the incoming and outgoing flow stream, which difference is sometimes referred to as the "pinch." This allows higher oxidant flow and higher cell temperature without excessive dry-out. Thus, it should be understood that the embodiments of FIGS. 2 and 3 have an enthalpy exchanger that is folded over the fuel cell so that it aligns with and is more closely integrated into the fuel cell system so as to reduce the footprint of the fuel cell system. The enthalpy exchanger also allows additional heating provided by the warm anode exhaust from the anode chamber.

Figure 4:
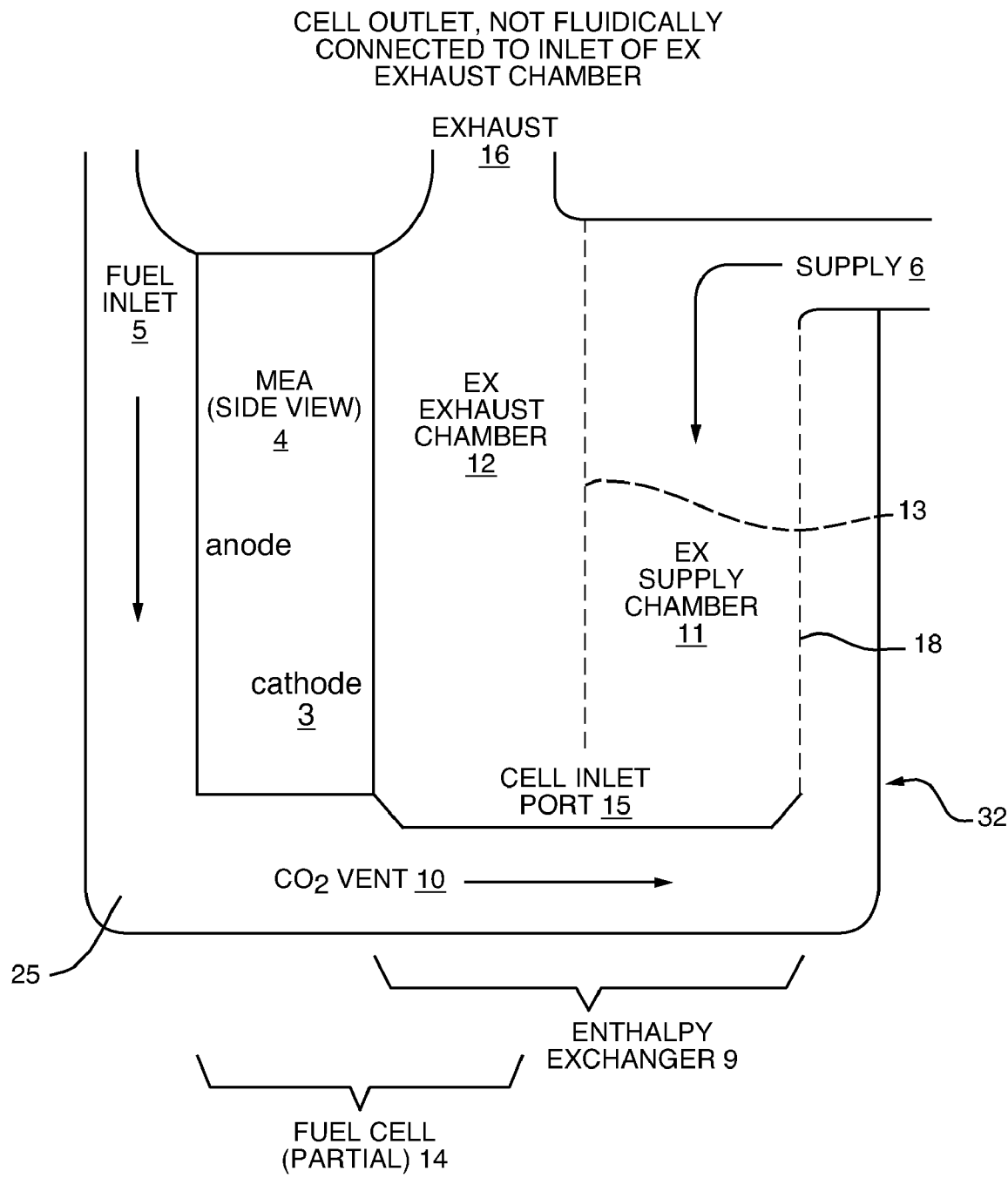
FIG. 4 is a schematic diagram of a fuel cell system having a thermally integrated enthalpy exchanger that also uses the carbon dioxide effluent in the enthalpy exchange of the fuel cell system.

FIG. 4 illustrates a further embodiment of the invention in which the internal or heat of the fuel cell is even further utilized in the enthalpy exchange feature of the present invention in that the anode exhaust exit stream is also driven to the internal integrated enthalpy exchanger 9 of the present invention. More specifically, FIG. 4 illustrates a fuel cell system 400 in which the anode exhaust gas 10 is vented to the opposite face of the inlet chamber 11. In the meantime, the incoming oxidant stream enters the fuel cell system at the inlet 6 and passes through the manifold of the incoming supply chamber manifold 11 through the cell inlet port 15 and around to the cathode 3. Humid exhaust from the cathode allows water to collect on the enthalpy exchange element 13. In addition, humidity from the anode exhaust stream 10 collects on a second enthalpy exchanger element 18. In this way, the enthalpy exchanger inlet supply chamber 11 has two walls which are comprised of enthalpy exchange elements 13 and 18 respectively which both collect water and enhance the hydration of the incoming supply stream. Fuel cell exhaust exits through cell outlet 16 which is not fluidically connected to supply the inlet of the enthalpy exhaust chamber. Notably, the embodiment illustrated in FIG. 4 provides further improvements in incoming flow heating and water recovery where the reduced need for water recovery is enabled by the internal pushback of water to thus allow a smaller enthalpy exchanger than in the prior art. These smaller enthalpy exchange features of the embodiment of FIG. 4 are packaged directly over the face area of the cathode 3. This eliminates the separate layer and ports required for a discreet enthalpy exchanger of the prior art. It further enables the addition of an anode exhaust vent 25 to the inlet of the enthalpy exchanger for complete thermal and package integration without significant additional assembly volume or thickness. It is noted that the walls between the exhaust chamber 12, the enthalpy supply chamber 11 and the various portions of the fuel cell, may be comprised of materials or features that allow further heat transfer through convection or conduction between the fuel cell core 14 and the enthalpy exchanger 9. In addition, a series of mechanical elements such as pins or posts or an outer frame 32 may be shared by the integrated fuel cell and enthalpy exchanger to provide further heat transfer.

Example

The embodiment of the present invention illustrated in FIG. 4 was tested and the test was performed using a fuel cell with about 12 square centimeters of cell area. The operation comprised an anode flow of about 0.5 milliliters per minute of methanol and about 0.7 cubic centimeters of air on the cathode side. The dimensions of the inlet 5 measured perpendicular to the cell area or left to right in the figure was about 0.03 inches. The protonically conductive layer plus diffusion layers was about 0.025 inches thick including a protonically conductive layer being 0.001 to 0.005 inches thick. The exhaust chamber 12 and supply chamber 11 were each about 0.03 inches wide in diameter. The cathode flow was present at the air inlet 6 at a pressure of about 0.3 psi. The fuel cell was run at a temperature of 80° C. This produced power output capacity of about 50 milliwatts per square centimeter of cell area.

It should be further noted that the air inlet supply and exhaust will be enhanced using fans and pumps as appropriate in accordance with the pressures desired in a particular application of the invention.

Figure 5:
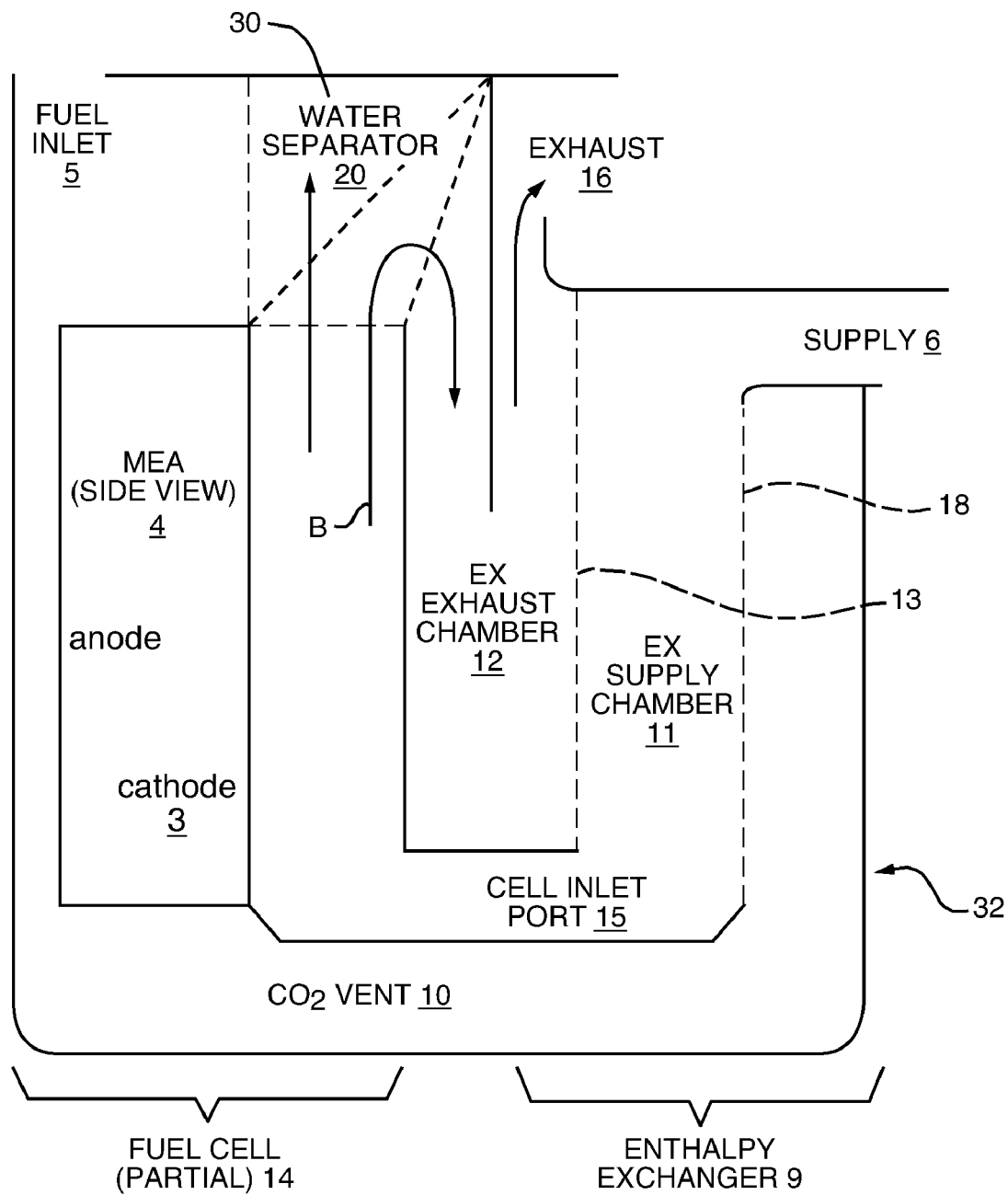
FIG. 5 is a schematic diagram of a fuel cell system having a thermally integrated enthalpy exchanger that also uses a water separator.

FIG. 5 illustrates another embodiment of the invention which a fuel cell system 500 also includes a water separator 20. In FIG. 5, the water separator 20 is fluidically coupled between the outlet of cell inlet port 15 and the enthalpy exhaust chamber 12. More specifically, as in FIG. 4, at the anode, the anode exhaust stream passes through anode exhaust vent 10 back around to the enthalpy exchange features 9 where water collects on the enthalpy exchange element 18. Exhaust from the cathode, which is the humid air minus the oxygen needed in the cathode reaction, travels along the direction of the arrow B and makes the U-turn back into the enthalpy exhaust chamber 12. This humid air allows water to collect on the enthalpy exhaust element 13. Thus, as in FIG. 4, the fuel cell system of 500 of FIG. 5 allows the supply entering through inlet 6 to be hydrated by the two walls 13 and 18 that have water collected there upon from the fuel cell reaction exhaust. The exhaust gasses minus the water vapor exits the exhaust outlet 16 in a manner similar to that described hereinbefore. In addition, if there is excess water produced at the cathode that does not need to be pushed back across to the anode side for the anode reaction, or that is not used to hydrate the elements 13 and 18, such excess water can be collected using a conventional water separator 20 in the area 30 of the system 500. This water can then be used either as a water source or to provide additional water to the anode if needed.

It should be understood that the present invention provides the advantages of reduced system volume and cost by provided a reduction and integration of a novel enthalpy exchange system as compared to conventional external hydration systems that have been used to maintain the adequate hydration of the protonically conductive layer of the fuel cell. Further advantages of the fuel cell system having the enthalpy exchanger of the present invention that result from increased hydration include increased system efficiency by allowing the fuel cell to be operated at higher temperatures using the inventive technique of recycling exhaust heat in part through the enthalpy exchange system. As noted, this enthalpy exchanger maintains the hydration of the membrane material even when the fuel cell is operated at higher temperatures, thereby allowing the fuel cell to provide increased cell voltages, increased power output and increased efficiency. In other words, the present invention allows the fuel cell to be operated at higher temperatures without drying out. Additionally, a wider operating range and faster startup time is produced from the integration of hydration and capture and reuse of more of the reaction heat which otherwise would be wasted. The fuel cell has reduced emissions by recycling reactions of anode exhaust in the embodiments which recycle the anode exhaust stream.

What is claimed is:

1. A direct oxidation fuel cell system, comprising:
   (A) a protonically conductive material, having water permeability that allows a rate of internal supply of water from a cathode side to an anode side of the fuel cell to be achieved, said protonically conductive material intimately interfacing with a catalyst along each of said layer's major surfaces, and having an anode aspect and a cathode aspect;
   (B) a fuel source coupled to said fuel cell;
   (C) an enthalpy exchanger coupled to said cathode aspect having an incoming oxidant inlet conduit and an exhaust outlet disposed to provide a flow between the inlet and the outlet streams, and an enthalpy exchange element disposed between the streams that encourages water collection thereon to humidify the incoming oxygen stream; and
   (D) effective water supply from cathode to anode within said fuel cell, so that water management in said fuel cell is achieved without water transport from cathode to anode external to the active volume of the fuel cell.

2. The direct oxidation fuel cell system as defined in claim 1 wherein said water supply is provided by favorable partial pressure of water within the fuel cell system.

3. The direct oxidation fuel cell system as defined in claim 1 wherein said water supply is provided by favorable hydrostatic pressure of water within the fuel cell system.

4. The direct oxidation fuel cell system as defined in claim 1 further comprising a hydrophobic layer placed adjacent to said cathode aspect to further enhance water pushback from cathode to anode.

5. The direct oxidation fuel cell system as defined in claim 4 further comprising a hydrophobic coating on said cathode aspect to further enhance water pushback from cathode to anode.

6. The direct oxidation fuel cell system as defined in claim 1 further comprising a hydrophilic layer adjacent to said anode aspect.

7. The direct oxidation fuel cell system as defined in claim 1 wherein said enthalpy exchanger is a two layer feature disposed adjacent to the protonically conductive layer.

8. The direct oxidation fuel cell system as set forth in claim 1, further comprising a housing.

9. The direct oxidation fuel cell system as set forth in claim 1, wherein said incoming oxidant inlet conduit and an exhaust outlet disposed to provide a flow between the inlet and the outlet streams which are substantially counterflowing streams, and an enthalpy exchange element disposed between the counter flowing streams that encourages water collection thereon to humidify the incoming oxygen stream.

10. A direct oxidation fuel cell, comprising:
    (A) a protonically conductive material that allows a rate of internal supply of water from a cathode side to an anode side of the fuel cell to be achieved, said protonically conductive layer intimately interfacing with a catalyst along each of said material's major surfaces, and having an anode aspect and a cathode aspect;
    (B) an enthalpy exchanger coupled to said cathode aspect having an incoming inlet conduit and an exhaust outlet disposed to provide a counter flow between the inlet and the outlet streams, and an enthalpy exchange element disposed between the counter flowing streams that encourages water transfer therethrough to humidify the incoming oxygen stream; and
    (C) at least one exhaust vent coupled between said anode aspect and said enthalpy exchanger such that moisture and heat in an exhaust stream from anode reactions are introduced into said enthalpy exchanger from said exhaust stream.

11. The direct oxidation fuel cell as defined in claim 10 wherein said exhaust vent is disposed such that the exhaust stream is injected into the inlet stream of said enthalpy exchanger.

12. The direct oxidation fuel cell as defined in claim 11 wherein said exhaust vent includes a catalyst therein for conversion of fuel to create additional heat to be injected into said inlet stream.

13. The direct oxidation fuel cell as defined in claim 12 wherein said fuel is contained within the stream that is exiting the anode chamber.

14. The direct oxidation fuel cell as defined in claim 11 wherein said exhaust vent is disposed such that the exhaust stream is injected into the outlet stream of said enthalpy exchanger.

15. The direct oxidation fuel cell as defined in claim 14 wherein said exhaust vent includes a catalyst therein for conversion of fuel to create additional heat.

16. The direct oxidation fuel cell as defined in claim 11 wherein said vent directly injects exhaust stream in to the inlet stream of the enthalpy exchanger.

17. The direct oxidation fuel cell as defined in claim 11 wherein said exhaust stream includes unreacted fuel.

18. The direct oxidation fuel cell as defined in claim 17 wherein said unreacted fuel is allowed to react with oxygen in said inlet stream to create heat.

19. A fuel cell comprising:
(A) an anode and cathode coupled to receive fuel and oxygen respectively and an electrolytic layer such that anodic and cathodic reactions occur generating heat and electricity; and
(B) a thermally and mechanically integrated enthalpy exchanger located along said cathode having an inlet air stream into which waste heat is directed to provide heat transfer from said fuel cell to said inlet air stream, said enthalpy exchanger further providing humidity to said inlet air stream to provide humidity to the cathode.

20. The fuel cell as defined in claim 19 wherein a portion of said heat transfer is conductive between a structure in the fuel cell and a structure in the enthalpy exchanger.

21. The fuel cell as defined in claim 20 wherein said structure is a series of elements that couple the fuel cell to the enthalpy exchanger.

22. The fuel cell as defined in claim 20 wherein said structure is a shared frame between the fuel cell and the enthalpy exchanger.

23. The fuel cell as defined in claim 20 wherein said structure provides physical or mechanical contact between the fuel cell and said enthalpy exchanger.

24. The fuel cell as defined in claim 19 wherein said heat transfer is convective between cathode effluent and inlet gas flow in said heat exchanger.

25. The fuel cell as defined in claim 19 wherein said enthalpy exchanger further comprises two layers substantially co-extensive within the fuel cell.

26. The fuel cell as defined in claim 25 wherein said enthalpy exchanger further comprises a first chamber coupled to an air inlet and a second chamber coupled to a reactant exhaust outlet.

27. The fuel cell as defined in claim 26 further comprising one or more adjacent fuel cells and wherein heating in said enthalpy exchanger is further enhanced by heating said incoming stream by directing waste heat from an adjacent fuel cell directly to said incoming stream.

28. The fuel cell as defined in claim 25 wherein a cathode chamber is one of said chambers of said enthalpy exchanger.

29. The fuel cell as defined in claim 28 further comprising one or more moisture-permeable membranes separating said chambers of said enthalpy exchanger.

30. The fuel cell as defined in claim 19 further comprising a second source of heat being transferred to the incoming stream in addition to the heat from fuel cell reactions.

31. The fuel cell as defined in claim 30 wherein heat from the fuel cell reactions is provided to the anode exhaust stream prior to said exhaust stream being added to said incoming stream.

32. The fuel cell as defined in claim 19 wherein heat is delivered substantially into a portion of an inlet conduit in which said inlet air stream flows that is nearest to said fuel cell.

33. The fuel cell as defined in claim 19 wherein about 90% of heat transferred to said inlet air stream is spread over about 80% of a conduit receiving the inlet air stream.

34. A fuel cell comprising:
(A) an anode and cathode coupled to receive fuel and oxygen respectively and an electrolytic layer such that anodic and cathodic reactions occur generating heat and electricity;
(B) a thermally and mechanically integrated enthalpy exchanger having an inlet air stream into which waste heat is directed to provide heat transfer from said fuel cell to said inlet air stream; and
(C) a second source of heat being transferred to the incoming stream in addition to the heat from fuel cell reactions, said second source of heat as a means for reacting unused fuel and transferring heat thereby created to the incoming stream.

35. The fuel cell as defined in claim 34 further comprising said second source of heat from electrical resistance.

36. The fuel cell as defined in claim 35 wherein said electric resistance heat is provided by a resistance heater powered by output power of said fuel cell.

37. A fuel cell comprising:
(A) an anode and cathode coupled to receive fuel and oxygen respectively and an electrolytic material disposed such that anodic and cathodic reactions occur generating heat and electricity, and a portion of said fuel cell adjacent to an anode aspect of said layer being an anode side and a portion of said fuel cell adjacent to a cathode aspect of said layer being a cathode side;
(B) a thermally and mechanically integrated enthalpy exchanger having an inlet air stream into which waste heat is directed to provide heat transfer from said fuel cell to said inlet air stream; and
(C) a water separator disposed at a cathode outlet wherein liquid water is returned to the anode side.

38. A fuel cell comprising:
(A) an anode and cathode coupled to receive fuel and oxygen respectively and an electrolytic layer such that anodic and cathodic reactions occur generating heat and electricity; and
(B) a thermally and mechanically integrated enthalpy exchanger located along said cathode having an inlet air stream into which waste heat is directed to provide heat transfer from said fuel cell to said inlet air stream, wherein said heat is from a load driven by said fuel cell, and an enthalpy exchanger further providing humidity to said inlet air stream to provide humidity to the cathode.

* * * * *